Figure 1:
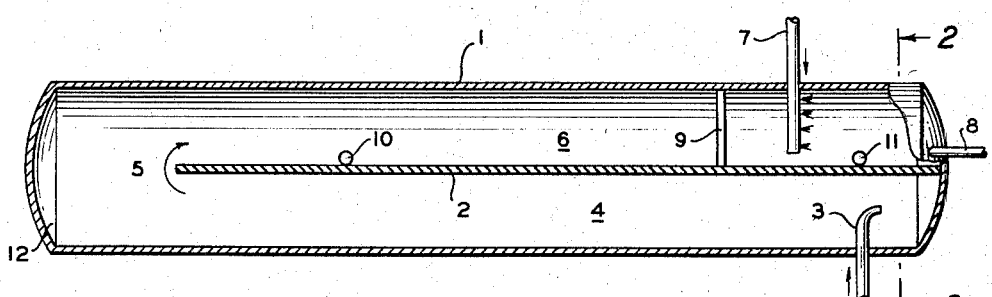

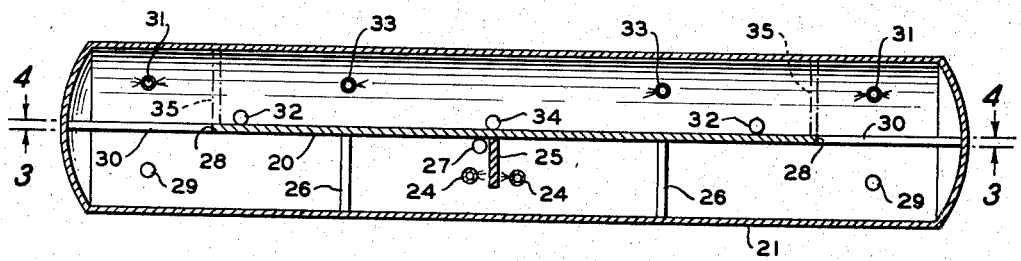
FIG. 5
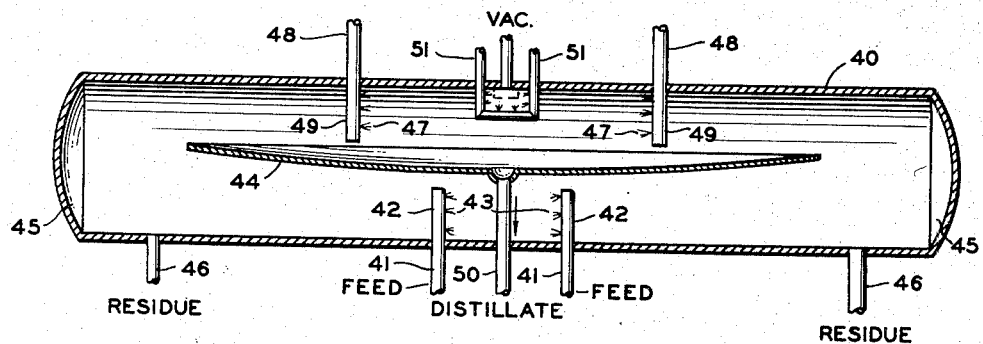
FIG. 6
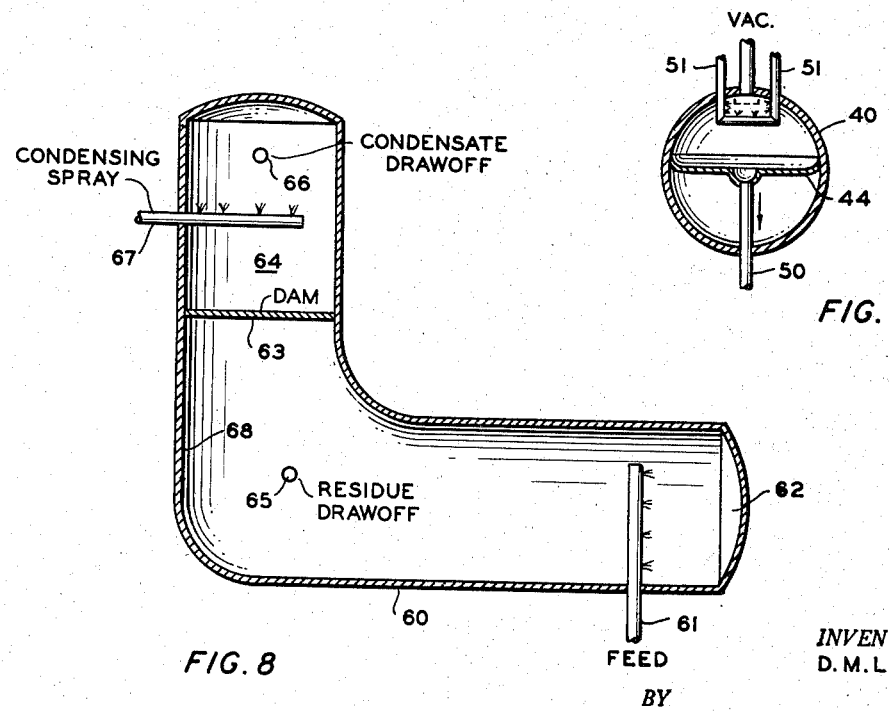
FIG. 7
FIG. 8
INVENTOR.
D. M. LITTLE
BY
Hudson and Young
ATTORNEYS

United States Patent Office 2,875,139
Patented Feb. 24, 1959

2,875,139

APPARATUS FOR OBTAINING MAXIMUM DEPTH OF FLASH OF OILS AND THE LIKE

Donald M. Little, Bartlesville, Okla., assignor to Phillips Petroleum Company, a corporation of Delaware Application May 22, 1953, Serial No. 356,848

11 Claims. (Cl. 202—185)

This invention relates to the flashing and recovery of vapors from fluids. In one aspect of the invention it relates to an apparatus in which no transverse impediment of any significant character is present in the line of flow of vapors resulting from a flashing of vapors from a liquid. In still another aspect of the invention as it relates to an apparatus embodiment especially suited to the flashing of vapors from mineral oils, there is provided a substantially horizontal flashing drum in which provision is made for separation of entrained liquid from generated vapors without presenting any significant obstruction transversely of the line of flow of said vapors.

The design and use of substantially horizontally placed elongated vessels or flashing drums for the separation of vapors from liquids, e. g., distillate from mineral oils, obtaining a liquid residue, is known to this inventor. Such vessels comprise a horizontally disposed elongated shell into one end of which is fed a stream of oil preheated to a desired temperature. The oil, upon entering the vessel, undergoes flashing liberating vapors which are passed through baffles and/or sprays in order to obtain a clean distillate vapor at or near the other end of the vessel in which end there are provided condensing sprays to cause condensation of the distillate vapors. Distillate is withdrawn from the vessel at said other end thereof. In order to avoid contamination of condensed distillate with residual oil which accumulates along the bottom of the vessel there is provided a dam across the bottom of the vessel substantially at right angles to its longitudinal axis to cause accumulation between said dam and the point of entry of the feed of said residual oil. Means are provided for withdrawing the residual oil as it accumulates. Such vessels are advantageously provided with vacuum jets and conduits leading to said jets can be provided with guard chambers, etc. In Serial Number 188,604 filed October 5, 1950, now abandoned, by V. C. Cavin et al. there are described and claimed a method and apparatus in which a material to be distilled is fed into and flashed at one end of an elongated chamber or vessel and treated with a "clean-up" spray which is at substantially the temperature of the vapors to cause removal from said vapors of entrained droplets of residual material. The vapors are then treated with a condensing spray to cause condensation of a distillate which is recovered. In Serial Number 241,183 filed August 10, 1951, now abandoned, by Paul M. Waddill there are described and claimed, additionally, a method and apparatus in which a two-stage separation of vapors from materials or oils to be flashed is practiced by causing materials fed to the ends of a vessel to be flashed toward a mid-portion thereof and condensed at said mid-portion to which a source of vacuum can be applied. In a specific embodiment there described, residual oil from one end of the vessel is used as feed for the other end of said vessel, thus in effect accomplishing a two-stage flashing or distillation. In still another embodiment described, the material to be flashed is fed to one end of a vessel and vapors are condensed and removed downstream from said end and recovered as distillate product. The residual oil resulting from said flashing is passed to another vessel for flashing at a reduced pressure by virtue of a pipe connection of said vessel with said first-mentioned vessel at a point down-stream from said first-mentioned end of said mentioned vessel.

In the said methods and apparatus known to me there can be employed baffles which are placed substantially transversely of the flow of the generated vapors. Obviously, whenever a flowing fluid must pass through a baffle, there is encountered a pressure drop and, therefore, upstream of said baffle the flashing pressure will be higher than it would be were there no baffle.

I have now found that it is possible to eliminate use of all baffles which are transversely placed in respect of vapor flow, yet I am able to remove from vapors generated upon flashing a material to be separated into a vapor and a residual liquid any entrained droplets of residual liquid.

According to the invention, there is provided an apparatus in which the vapors generated by flashing a material which is to be separated into vapors and a residual liquid are caused to be turned through an angle or to pass around at least one end of a partition which is longitudinally disposed within a substantially horizontally placed elongated vessel.

In passing around the end of the partition, the vapors are turned through an angle of about 90 degrees, preferably through about 180 degrees. The momentum of any entrained residual liquid causes said liquid to tend to continue in the same direction and sense in which the vapors were travelling before the vapors were turned through said angle. This causes impingement of the said entrained liquid or droplets or particles upon the inside of the end wall of the vessel at which the said particles coalesce and flow to the bottom of said vessel from which said entrained material or liquid can be withdrawn.

An important feature of the invention resides in the arrangement of a surface for impingement of the entrained liquid such that there is present on said surface no substantial quantity of liquid, thus avoiding the picking up of such liquid by the vapors which, of course, would defeat one of the objects of the invention, namely, the removal of entrained liquid. Thus, according to this invention, the surface upon which or against which the entrained droplets are caused to impinge is substantially vertically disposed to cause immediate run-down of any remainder which otherwise would tend to collect thereon. Furthermore, the surface against which the entrained droplets are caused to impinge can be machined in various ways to cause the collected entrained liquid to resist separation from said surface owing to frictional or other contact of the vapors therewith at said surface.

Figure 2:
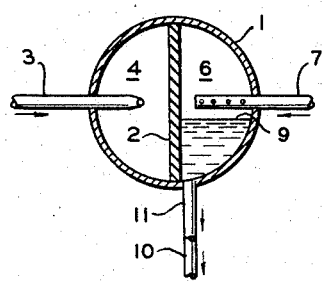
Figure 3:
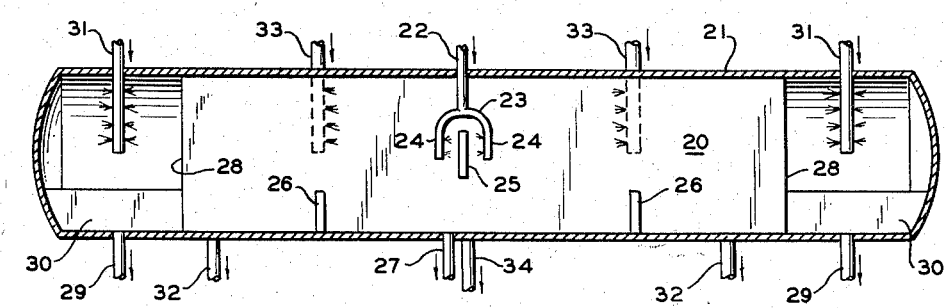
Figure 4:
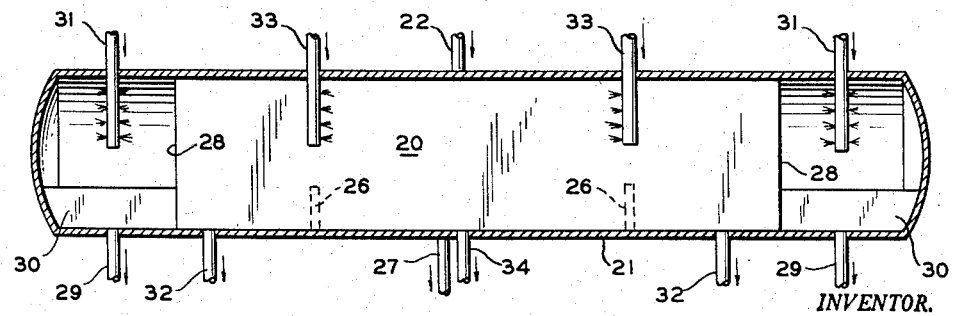

In order to more fully set forth and to more fully describe the apparatus according to this invention, reference is made to the drawings in which Figure 1 is a view from above of a horizontal cross-section taken longitudinally along the axis of a substantially horizontal vessel into which the feed or material to be flashed is fed at one side of a vertical solid partition plate and vapors condensed and removed on the other side of said plate as more fully described below. Figure 2 is a vertical cross-section at 90 degrees, along line 2—2, to the longitudinal axis of the embodiment of the invention shown in Figure 1. Figure 3 is a vertically taken longitudinal cross-section passing through the axis of another vessel according to the invention showing the feed inlet and residue draw-off side of a partition member. Figure 4 shows the vapor condensing and removal side of the vessel of Figure 3. Figure 5 is a view from above of a horizontally taken longitudinal cross-section through the axis of the vessel of Figure 3. Figure 6 is a vertically taken longitudinal cross-section passing through the axis of still another vessel according to the invention showing feed inlets arranged below a partition around the ends and up over which vapors flashed below said partition are passed and into which said vapors are condensed and from which distillate liquid is withdrawn. Figure 7 is a vertical cross-section taken at right angles to and at the midpoint of the longitudinal axis of the vessel of Figure 6. Figure 8 is a top view in cross-section of an elementary embodiment of the invention in which the vapors are turned through an angle of the order of 90 degrees.

DESCRIPTION OF FIGURE 1

In Figure 1 is shown horizontally disposed vessel 1 provided with vertical solid partition plate 2 which extends from the right-hand end of vessel 1 along its longitudinal axis to a point near the other end of the vessel such that the free area or opening between the end of the partition and said other end of the vessel is substantially equivalent to the cross-sectional area between partition 2 and the sides of the vessel. As shown, partition 2 is placed so that it passes through the longitudinal axis of the vessel. It is clear that partition 2 may be so positioned that it will pass to one side or the other of said longitudinal axis. Material or liquid to be flashed is introduced through inlet conduit 3 into section 4 in which flashing or vaporization is caused to occur. Vapors pass from section 4 through space 5, are turned through 180 degrees, and passed through section 6 in which they are treated with a condensing spray 7 causing their condensation to liquid distillate product. In order to prevent intermingling of residual liquid and distillate product a dam 9 is provided, residual liquid being withdrawn through conduit 10 and distillate product being withdrawn through conduit 11. A conduit 8 suitably equipped with a guard chamber (not shown) leads to a vacuum jet which in the modification described is employed to cause interior of vessel 1 to be a zone of reduced pressure. In some instances, it is advantageous to provide the interior surface of the vessel 1, as shown at 12, with a surface which is so machined as to encourage coalescing and rapid draining therefrom of entrained liquid droplets which are caused to impinge on said surface. Although spray 7 has been described to be a condensing spray, it is clearly within the scope of the invention to employ more than one spray, to employ no spray at all relying merely upon radiation cooling to condense the vapors. It is also within the scope of the invention to remove the vapors from vessel 1 and to cause their condensation elsewhere. In any event, it is also within the scope of the invention to use spray 7 as a "clean-up" spray as more fully described and set forth in above-mentioned Serial Number 188,604. Still further, when spray 7 is employed it can be oriented in any desired direction. The positioning of withdrawal 10 is not critical as long as it is placed so that residual liquid formed upon flashing and collected at the base of end 12 of the vessel can be accomplished. More than one residual liquid withdrawal or outlet can be provided.

DESCRIPTION OF FIGURE 3

In Figure 3 substantially horizontally placed vessel 21 is provided with vertical partition 20. Feed is passed through conduit 22, manifold 23, and spray heads 24 into the vessel on one side of partition 20. As shown, the feed is caused to impinge upon a porous mat 25 or other surface encouraging flashing of the vapors with minimum entrainment of liquid residue which collects between dams 26 and is withdrawn through conduit 27. Vapors flashed from liquid introduced through spray heads 24 is passed around the ends 28 of partition 20 over dams 30. Turning around the ends 28 the vapors give up entrained material which falls and collects between dams 26 and 30, and which is withdrawn at 29. Owing to cooling due to radiation (or by means not shown), some condensate collects between dams 26 and 30 and it, too, is withdrawn through conduits 29. For ease of illustration, the dams 30 have been shown to lie in a plane with the longitudinal axis of the vessel. However, it is clear that for maximum clean-up of the vapors owing to the centrifugal force developed as the vapors are turned around the ends of partition 20, the dams 30 can be placed at right angles to a plane passing vertically through the longitudinal axis of the vessel. Such dams are indicated by dotted lines 35 in Figure 5. Sprays 31 which can be operated as described in connection with Figure 1, can be employed to cause condensation of distillate product which will collect to the far side of dams 30 and which can be withdrawn at 32. When desired to operate sprays 31 as clean-up sprays substantially at the temperature of the vapors passing over dam 30, liquid withdrawn through 32 will consist substantially only of the clean-up spray liquid in which event clean condensate is condensed by means of sprays 33 and withdrawn at 34. Vacuum-producing means, not shown, suitably protected by a guard chamber, are applied to vessel 21 near outlet 34 but, obviously, placed at a point above withdrawal conduit 34 which is placed at or near the bottom of the vessel. The sprays 31 or sprays like sprays 31 can be placed before or after dams 30 and, indeed, additional dams can be provided between the withdrawals 32 and withdrawal 34 in order to separate liquids accumulating on that side of partition 20 into several portions as desired.

DESCRIPTION OF FIGURE 6

In Figure 6 feed is passed into chamber 40 through conduits 41, manifolds 42, and spray heads 43. Vapors are generated and passed around the ends of partition 44. In passing around the ends of partition 44, entrained droplets are caused to impinge against each other and against ends 45 of vessel 40 and any liquid thus entrained and liquid residue formed in the vessel are withdrawn through conduits 46. Vapors passing upward and to a point above partition 44 are condensed employing sprays 47 to which suitable condensing fluid is fed through lines 48 and manifold 49. Clean condensate accumulates in partition 44, which is dished to provide for such collection, and is withdrawn therefrom through conduit 50. Vessel 40 is advantageously connected to a souce of vacuum which is protected by cold guard spray 51.

It will be obvious to one skilled in the art in possession of this disclosure that by virtue of the design of the apparatus of my invention and its operation according to the method of the invention, the pressure drop from the point of flash to the point of connection with the vacuum-producing means is considerably reduced and, indeed, whereas pressure drops of from 2000 to 2500 microns of mercury have been experienced in other forms of apparatus and methods, the only pressure drop experienced when operating according to the method of this invention is that of flow in an open vessel with reversal of flow at at least one end thereof. In terms of improvement resulting from the invention, it now appears that the same quantity of distillate, for instance, gas oil, can be flashed from a feed at 600° F. as heretofore could be flashed at 680° F. in cases in which baffles placed transversely of the path of flow have been employed. Thus, it is clear that according to the present invention, there is obtained an increased depth of flash at the same temperature or the same depth of flash at a lower temperature, the advantages of which are readily apparent to one skilled in the art. The herein described apparatus is especially useful for the vacuum flashing of various hydrocarbon oils especially at reduced pressures as in the case of deep flash of residual oils to obtain maximum distillate product at minimum temperature. Further, the invention is especially well adapted to partial dehydration, by flashing, of food products such as milk and fruit juices, vegetable oils, animal oils and solutions or suspensions of various materials or chemicals especially at reduced pressures.

Reasonable variation and modification are possible within the scope of the foregoing disclosure, drawings, and the appended claims to the invention, the essence of which is that vapors flashed from a liquid to be separated into a vapor portion and a liquid portion are caused to turn through at least 90 degrees more or less, there being no substantial quantity of liquid in the line of flow of said vapors, to cause centrifugal removal of entrained liquid particles from said vapors and that apparatus essentially comprising a horizontally placed elongated shell having therein a longitudinal partition means, said partition means extending a substantial length within said vessel and said vessel being provided with an inlet means communicating with the inside of said vessel on one side of said partition and an outlet means communicating with the inside of said vessel on the other side of said partition, thus establishing a passageway through said vessel around at least one end of said partition means within said vessel, have been provided substantially as set forth and described herein.

Referring now to Figure 8, a material to be distilled or flashed is fed into vessel 60 through conduit 61 and, as shown, is sprayed against the end wall 62 of said vessel. Vapors generated pass through the vessel turning through an angle of about 90 degrees, over dam 63, which is adapted to prevent unflashed residue material from leaving the flashing section of the vessel, into a condensing section 64 in which the vapors are condensed. Residue is withdrawn from the vessel through conduit 65 and condensate is withdrawn from the vessel through conduit 66. A condensing spray 67 is employed to cause the desired condensation of the vapors. As the vapors are turned in the vessel entrained non-vaporized material impinges by virtue of its acquired momentum upon the inside wall 68 of the vessel and flows down said wall and ultimately out from the vessel through conduit 65.

*Example*

The table summarizes an operation of the invention.

Flash temperature _____ 610° F.
Flash pressure _____ 500 microns Hg.
Vacuum jet pressure_____ 100 microns Hg.

|  | Barrels per Hour | Gravity, A.P.I. (60/60° F.) |
|---|---|---|
| Charge | 500 | [1] 19.0 |
| Condensate | 150 | 24.5 |
| Residue | 350 | 17.0 |

[1] Vacuum flashed topped crude.

I claim:

1. An apparatus for flashing a liquid into a vapor portion and a residual liquid portion which comprises in combination a substantially horizontal elongated flash distillation vessel, longitudinally disposed internal partition means within said vessel to provide two compartments within said vessel communicating with each other at at least one end of said partition means, a liquid inlet for liquid to be flashed at a locus substantially removed horizontally from said end of said partition means on one side of said partition means, a vapor condensing means at a locus substantially removed horizontally from said end of said partition means on the other side of said partition, means for condensing vapors, means for causing accumulation of condensed vapors separately from all non-vaporized liquid including any entrained liquid, liquid withdrawal means in the bottom of said vessel for withdrawing accumulated residual liquid, and withdrawal means for withdrawing condensed vapors.

2. An apparatus adapted to flash vaporize a liquid material which comprises in combination a substantially horizontally disposed elongated cylindrical flash distillation tank, a vertically disposed substantially axially positioned partition member within said tank dividing said tank into two compartments communicating at at least one end of said partition member, liquid inlet means for introducing into one of said compartments liquid to be flashed, said liquid inlet means being located at a locus remote from the end of said partition means at which said compartments communicate with each other, a dam at right angles to the axis of said tank across the bottom of the compartment on the side opposite said inlet means, a liquid withdrawal means in the bottom of said tank on each side of said dam, a vapor condensing means positioned to cause condensation of vapors on the side of the dam remote from the said inlet means.

3. An apparatus according to claim 2 wherein the tank and partition means are of size relationship such that the communication between said compartments possesses a cross-sectional area substantially equal to that of at least one of said compartments, the end of the tank at which the compartments communicate is dished to provide for smooth flow of vapors around the end of said partition means and wherein vacuum-producing means to provide a vacuum within said tank are provided on said tank.

4. An apparatus for separating a liquid into a vapor and a residual liquid and to recover a condensed vapor substantially free from any entrained non-vaporized liquid which comprises in combination a substantially horizontally disposed elongated flash distillation vessel, a partition means substantially vertically disposed intermediate the ends of said vessel dividing the same into two compartments in open communication around the ends of said partition means, means for introducing liquid to be flashed into said vessel on one side of said partition means intermediate the ends thereof, a damming means in the bottom of the vessel on each side of said liquid introducing means intermediate said liquid introducing means and each end of said vessel to accumulate non-vaporized liquid, withdrawal means intermediate the upstream sides of said damming means to withdraw accumulated non-vaporized liquid from said vessel, additional damming means at the bottom of said vessel at each end of said partition means positioned within the compartment to the side of said partition means removed from said liquid introducing means, adapted to retain entrained residue dropping out from the vapor, liquid withdrawal means between each of said first-mentioned damming means and said second-mentioned damming means, condensing means to cause accumulation of condensed vapors beyond each of said last-mentioned damming means in said compartment remote from said liquid introducing mens and means for withdrawing condensed vapors from intermediate the down-stream sides of said last-mentioned damming means.

5. An apparatus according to claim 4 wherein evacuating means are connected to said vessel.

6. An apparatus for separating a liquid into a vapor and a residual liquid and to recover a condensed vapor substantially free from any entrained non-vaporized liquid which comprises a substantially horizontally disposed elongated flash distillation vessel, a dished partition member placed substantially horizontally within said vessel dividing the same into upper and lower compartments communicating with each other at at least one end of said partition member, liquid introducing means for introducing liquid to be flashed into the compartment below said partition member, a non-vaporized liquid withdrawal means in the bottom of said vessel, vapor condensing means above said partition member to cause condensation of vapors onto said partition member and means connected to said partition member and communicating with the outside of said vessel for withdrawing liquid from on top of said partition member.

7. An apparatus according to claim 6 wherein the vacuum producing means are connected to an upper portion of said vessel above said partition means.

8. A substantially horizontally elongated flash distillation vessel, longitudinal vertically disposed partition means shorter than said vessel disposed within said vessel, said partition means extending a substantial length within said vessel and an end of said partition being removed from an end wall of the vessel, a liquid inlet means communicating with the inside of said vessel on one side of said partition removed a substantial horizontal distance from said end of said partition, a liquid flashing section on said one side of said partition, a vapor condensing means on the other side of said partition, a liquid outlet means at the bottom of said vessel communicating with the inside of said vessel on said other side of said partition, thus establishing a passageway through said vessel around said end of said partition means within said vessel, said outlet means being removed a substantial horizontal distance from the said end of said partition.

9. A substantially horizontally elongated flash distillation vessel, longitudinal partition means shorter than said vessel disposed within said vessel, said partition means extending a substantial length within said vessel, an end of said partition being removed from an end wall of the vessel, a liquid inlet means communicating with the inside of said vessel on one side of said partition removed a substantial horizontal distance from said end of said partition, a liquid flashing section on said one side of said partition, a vapor condensing means on the other side of said partition, a liquid outlet means at the bottom of said vessel communicating with the inside of said vessel on said other side of said partition, thus establishing a passageway through said vessel around said end of said partition means within said vessel, said outlet means being removed a substantial horizontal distance from the said end of said partition.

10. An apparatus for flashing vapors from liquids to produce a condensed vapor product and a residual liquid product, the said condensed vapor product being substantially free from entrained liquid, which comprises in combination a substantially horizontal elongated flash distillation vessel, a longitudinal partition means of length shorter than the internal length of said vessel extending within said vessel a substantial length thereof adapted to divide said vessel substantially into at least two sections, namely, a flashing section and a vapor condensing section, an end of said partition being removed from an end wall of said vessel, a liquid inlet conduit communicating with said flashing section, a liquid condensate outlet conduit at the bottom of said vessel communicating with said vapor condensing section, and a vapor condensing means within said vapor condensing section, said liquid inlet and said liquid outlet conduits being removed a substantial horizontal distance from the said end of said partition.

11. An apparatus according to claim 10 wherein means are provided for accumulation of condensed vapors separately from non-vaporized liquid and any entrained liquid and wherein separate withdrawal means at the bottom of the vessel are provided for withdrawing accumulated non-vaporized liquid and condensed vapors.

References Cited in the file of this patent

UNITED STATES PATENTS

| | | |
|---|---|---|
| 240,762 | Rankin | Apr. 26, 1881 |
| 374,077 | Mathieu | Nov. 29, 1887 |
| 428,484 | Hagemann | May 20, 1890 |
| 907,379 | Laurent | Dec. 22, 1908 |
| 1,407,380 | Chenard | Feb. 21, 1922 |
| 1,757,579 | Loomis | May 6, 1930 |
| 1,982,598 | Sieck | Nov. 27, 1934 |
| 2,027,395 | McVoy | Jan. 14, 1936 |
| 2,125,325 | Youker | Aug. 2, 1938 |
| 2,177,664 | Lee | Oct. 31, 1939 |
| 2,222,575 | Schutte | Nov. 19, 1940 |
| 2,224,685 | Kahl | Dec. 10, 1940 |
| 2,358,559 | Clemens | Sept. 19, 1944 |
| 2,443,970 | Waddill | June 22, 1948 |
| 2,447,746 | Ferris et al. | Aug. 24, 1948 |
| 2,471,893 | Pulley | May 31, 1949 |
| 2,514,944 | Ferris et al. | July 11, 1950 |
| 2,610,142 | Lawrence | Sept. 9, 1952 |

FOREIGN PATENTS

| | | |
|---|---|---|
| 8,809 | Great Britain | June 27, 1891 |

OTHER REFERENCES

Perry: "Chemical Engineer's Handbook," page 514. June 21, 1950. (U. S. Patent Office Scientific Library.)